(12) United States Patent
Cunningham et al.

(10) Patent No.: US 6,497,277 B2
(45) Date of Patent: Dec. 24, 2002

(54) INTERNAL GATE VALVE FOR FLOW COMPLETION SYSTEMS

(75) Inventors: Christopher E. Cunningham, Spring, TX (US); Christopher D. Bartlett, Spring, TX (US); Thomas L. Hergarden, Houston, TX (US); Philip S. Hernandez, Stafford, TX (US); Michael E. Wilson, Jr., Spring, TX (US)

(73) Assignee: FMC Technologies, Inc., Chicago, IL (US)

( * ) Notice: Subject to any disclaimer, the term of this patent is extended or adjusted under 35 U.S.C. 154(b) by 0 days.

(21) Appl. No.: 09/815,436

(22) Filed: Mar. 22, 2001

(65) Prior Publication Data

US 2001/0042618 A1 Nov. 22, 2001

Related U.S. Application Data

(60) Provisional application No. 60/192,124, filed on Mar. 24, 2000.

(51) Int. Cl.[7] .............................................. E21B 19/00
(52) U.S. Cl. ..................... 166/95.1; 166/348; 166/97.1; 166/87.1; 166/86.3
(58) Field of Search .................................. 166/348, 368, 166/208, 95.1, 97.1, 87.1, 88.1, 321, 185, 186, 75.14, 86.3

(56) References Cited

U.S. PATENT DOCUMENTS

| | | | | |
|---|---|---|---|---|
| 3,448,803 A | * | 6/1969 | Sizer | 166/115 |
| 3,494,420 A | * | 2/1970 | Sizer | 166/250.01 |
| 4,258,786 A | * | 3/1981 | Lochte et al. | 137/625.18 |
| 4,405,014 A | * | 9/1983 | Talafuse | 166/72 |
| 4,572,298 A | * | 2/1986 | Weston | 137/625.48 |
| 4,630,244 A | * | 12/1986 | Larronde | 166/374 |
| 4,807,700 A | | 2/1989 | Wilkins | |
| 4,848,457 A | | 7/1989 | Lilley | |
| 4,903,774 A | * | 2/1990 | Dykes et al. | 166/321 |
| 4,958,686 A | | 9/1990 | Putch | |
| 4,967,842 A | * | 11/1990 | Franceschini et al. | 166/345 |
| 5,040,606 A | | 8/1991 | Hopper | |
| 5,044,432 A | | 9/1991 | Cunningham et al. | |

(List continued on next page.)

FOREIGN PATENT DOCUMENTS

| | | | |
|---|---|---|---|
| EP | 0331227 | * | 9/1989 |
| EP | 0 624 711 A1 | | 11/1994 |
| EP | 0624711 | * | 11/1994 |
| EP | 0 854 267 A2 | | 7/1998 |
| GB | 2 049 765 A | | 12/1980 |

(List continued on next page.)

*Primary Examiner*—Thomas B. Will
*Assistant Examiner*—Thomas A. Beach
(74) *Attorney, Agent, or Firm*—Henry C. Query, Jr.

(57) ABSTRACT

A gate valve for a component which includes an elongated body and a flow passage extending generally longitudinally through the body, the flow passage including a generally lateral first branch connected to a generally longitudinal second branch. The gate valve comprises a gate which is moveable generally longitudinally across the first branch between an open position in which a hole in the gate is aligned with the first branch and a closed position in which the hole is offset from the first branch; a conduit which extends through the body from the gate; an actuating mechanism positioned in the conduit for moving the gate from a first position to a second position; and a return biasing mechanism for moving the gate from the second position to the first position; wherein one of the first and second positions corresponds to the open position of the gate and the other position corresponds to the closed position of the gate; and wherein the conduit extends generally longitudinally through the body.

9 Claims, 9 Drawing Sheets

U.S. PATENT DOCUMENTS

| | | |
|---|---|---|
| 5,143,158 A | 9/1992 | Watkins et al. |
| 5,299,640 A * | 4/1994 | Streich et al. ............... 166/327 |
| 5,503,230 A | 4/1996 | Osborne et al. |
| 5,687,794 A | 11/1997 | Watkins et al. |
| 5,706,893 A | 1/1998 | Morgan |
| 5,988,282 A | 11/1999 | Jennings et al. |
| 6,145,594 A * | 11/2000 | Jones ......................... 166/361 |
| 6,345,668 B1 * | 2/2002 | Reilly ......................... 166/208 |

FOREIGN PATENT DOCUMENTS

| | | |
|---|---|---|
| GB | 2 214 543 A | 9/1989 |
| GB | 2 218 135 A | 11/1989 |
| GB | 2 291 085 A | 1/1996 |
| GB | 2 319 544 A | 5/1998 |
| WO | WO01/55550 A1 | 8/2001 |

\* cited by examiner

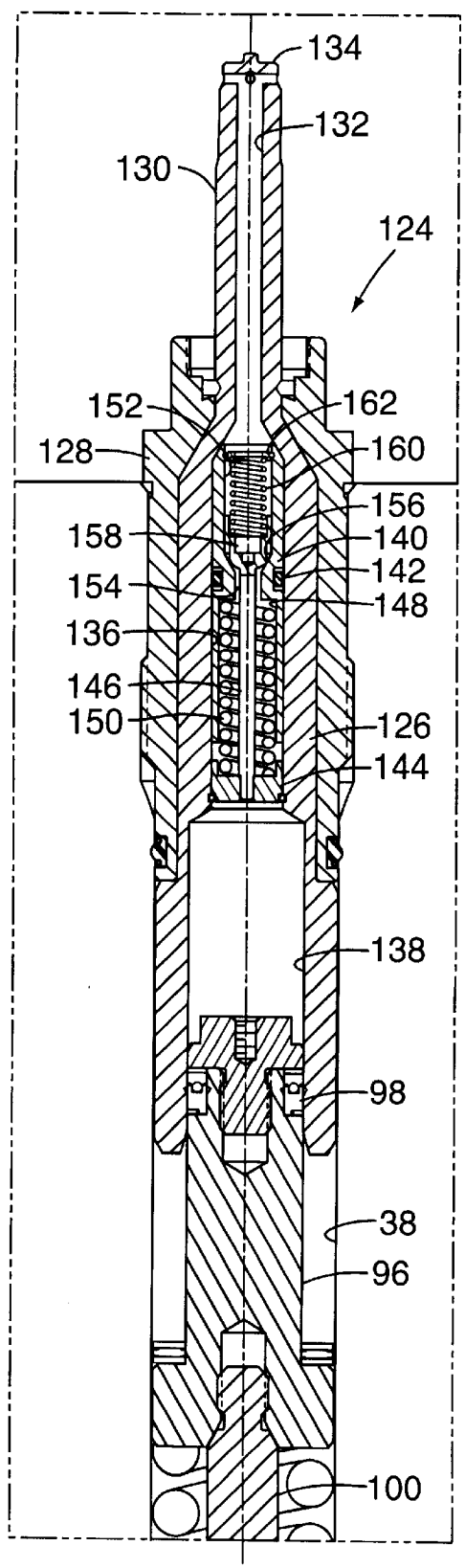
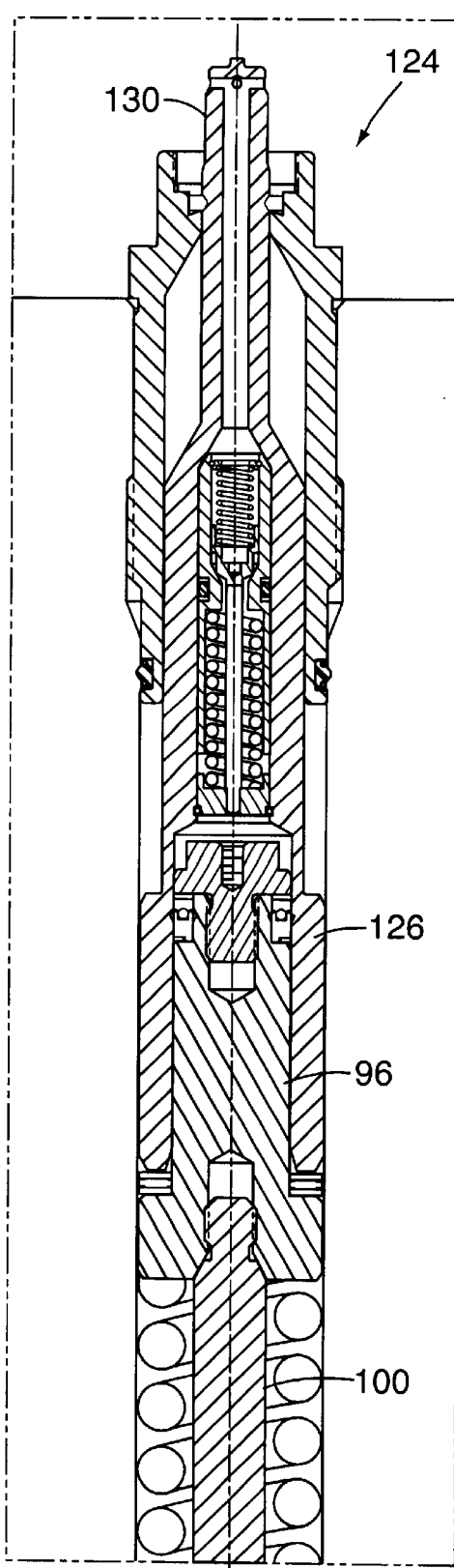
FIG. 7A
FIG. 7B

INTERNAL GATE VALVE FOR FLOW COMPLETION SYSTEMS

This application is based on U.S. Provisional Patent Application No. 60/192,124, which was filed on Mar. 24, 2000.

BACKGROUND OF THE INVENTION

The present invention relates to a gate valve which may be used to control the flow of fluid through various components of a flow completion system, such as a tubing hanger. More particularly, the invention relates to such a gate valve which is remotely operable and which is oriented generally longitudinally in the component and therefore occupies a minimum of the radial cross sectional area of the component.

The need to remotely and reliably control the flow of fluid through components having relatively small radial cross sectional areas is particularly strong in the field of flow completion systems for producing oil or gas from a subsea well. A typical horizontal-type flow completion system comprises a wellhead housing which is installed at the upper end of a well bore, a tubing spool which is connected to the top of the wellhead housing and which includes a central bore extending axially therethrough, and a tubing hanger which is suspended in the central bore and which supports at least one tubing string that extends into the well bore and defines a tubing annulus surrounding the tubing string. The tubing hanger is usually an annular component which includes at least one longitudinal production bore connected to the tubing string, a lateral production passageway that extends between the production bore and a production outlet in the tubing spool, and one or more service and control conduits for communicating control signals or fluids from external service and control lines to corresponding devices or positions located in or below the tubing hanger. In addition, the tubing hanger may include a longitudinal annulus bore for connecting the tubing annulus with the portion of the central bore located above the tubing hanger.

In operation of the flow completion system, flow through the annulus bore and the service and control conduits must be carefully controlled to ensure that well fluid does not escape into the environment. For example, during installation and workover of the flow completion system, the annulus bore must typically remain closed until a blowout preventer ("BOP") is installed above the tubing hanger, at which point the tubing hanger may be opened to allow for circulation of fluid between the production bore and the tubing annulus. In the prior art, a wireline plug is typically used to close the annulus bore. However, each installation or removal of the plug requires a special trip from a surface vessel. Moreover, although several versions of remotely operable valves for controlling flow through the annulus bore have been patented, these valves have for the most part been impractical to implement due to the limited radial cross sectional area that is available in the tubing hanger for such valves.

Therefore, a need exists for a remotely operable valve which can reliably control the flow of fluid through a flow completion system component but which occupies a minimum radial cross sectional area of the component.

SUMMARY OF THE INVENTION

In accordance with the present invention, these and other disadvantages in the prior art are overcome by providing a closure member for a component having an elongated body and a flow passage extending generally longitudinally through the body, the flow passage including a generally lateral first branch connected to a generally longitudinal second branch. The closure member comprises a gate which is moveable generally longitudinally across the first branch between an open position in which a hole in the gate is aligned with the first branch and a closed position in which the hole is offset from the first branch, a conduit which extends through the body from the gate, an actuating mechanism positioned in the conduit for moving the gate from the closed position to the open position, and a return biasing mechanism for moving the gate from the open position to the closed position, wherein the conduit extends generally longitudinally through the body. In a preferred embodiment of the invention the actuating mechanism comprises a piston which is connected to the gate and which sealingly engages the conduit, and means for conveying hydraulic pressure to a first portion of the conduit which communicates with the piston.

Thus, it may be seen that the components of the closure member which move the gate are aligned generally longitudinally relative to the gate. In this manner, the closure member occupies a minimum amount of the lateral cross sectional area of the component compared to prior art closure members. In addition, since hydraulic pressure is used to actuate the gate, the closure member may be operated remotely.

In one embodiment of the present invention, the closure member is adapted for use in a tubing hanger which is suspended in a tubing spool and which comprises an elongated body having an annulus bore that extends generally axially therethrough, the annulus bore comprising a generally lateral first branch connected to a generally axial second branch. Accordingly, the closure member comprises a gate which is moveable generally axially across the first branch between an open position in which a hole in the gate is aligned with the first branch and a closed position in which the hole is offset from the first branch, a conduit which extends generally axially through the body from the gate, an actuating mechanism positioned in the conduit for moving the gate from the closed position to the open position, and return biasing mechanism for moving the gate from the open position to the closed position. In a preferred embodiment of the invention, the actuating mechanism comprises a piston which is connected to the gate and which sealingly engages the conduit, and means for conveying hydraulic pressure to a first portion of the conduit which communicates with the piston. Furthermore, the tubing hanger ideally comprises first and second annular seals positioned between the body and the tubing spool, and the closure member further comprises a gate cavity in which the gate is at least partially positioned and which extends into the body from between the first and second seals, wherein pressure within the gate cavity is contained by the first and second seals.

Therefore it may be seen that the closure member of the present invention permits flow through the tubing hanger annulus bore to be reliably controlled from a remote location without the use of wireline plugs. Furthermore, since the gate and its actuating mechanism are oriented generally axially within the tubing hanger, the closure member occupies a minimum radial cross-sectional area of the tubing hanger.

These and other objects and advantages of the present invention will be made apparent from the following detailed description, with reference to the accompanying drawings. In the drawings, the same reference numbers are used to denote similar components in the various embodiments.

BRIEF DESCRIPTION OF THE DRAWINGS

FIG. 7A is a longitudinal cross-sectional view of the male override coupler of the gate valve depicted in FIG. 6 shown in its normal mode of operation;

FIG. 7B is a longitudinal cross-sectional view of the male override coupler of the gate valve depicted in FIG. 6 shown in its manual override mode of operation;

DETAILED DESCRIPTION OF THE PREFERRED EMBODIMENTS

While the gate valve assembly of the present invention may be used to control flow through a variety of flow completion system components, it will be described hereafter in connection with the tubing hanger component of an exemplary flow completion system.

Figure 1:
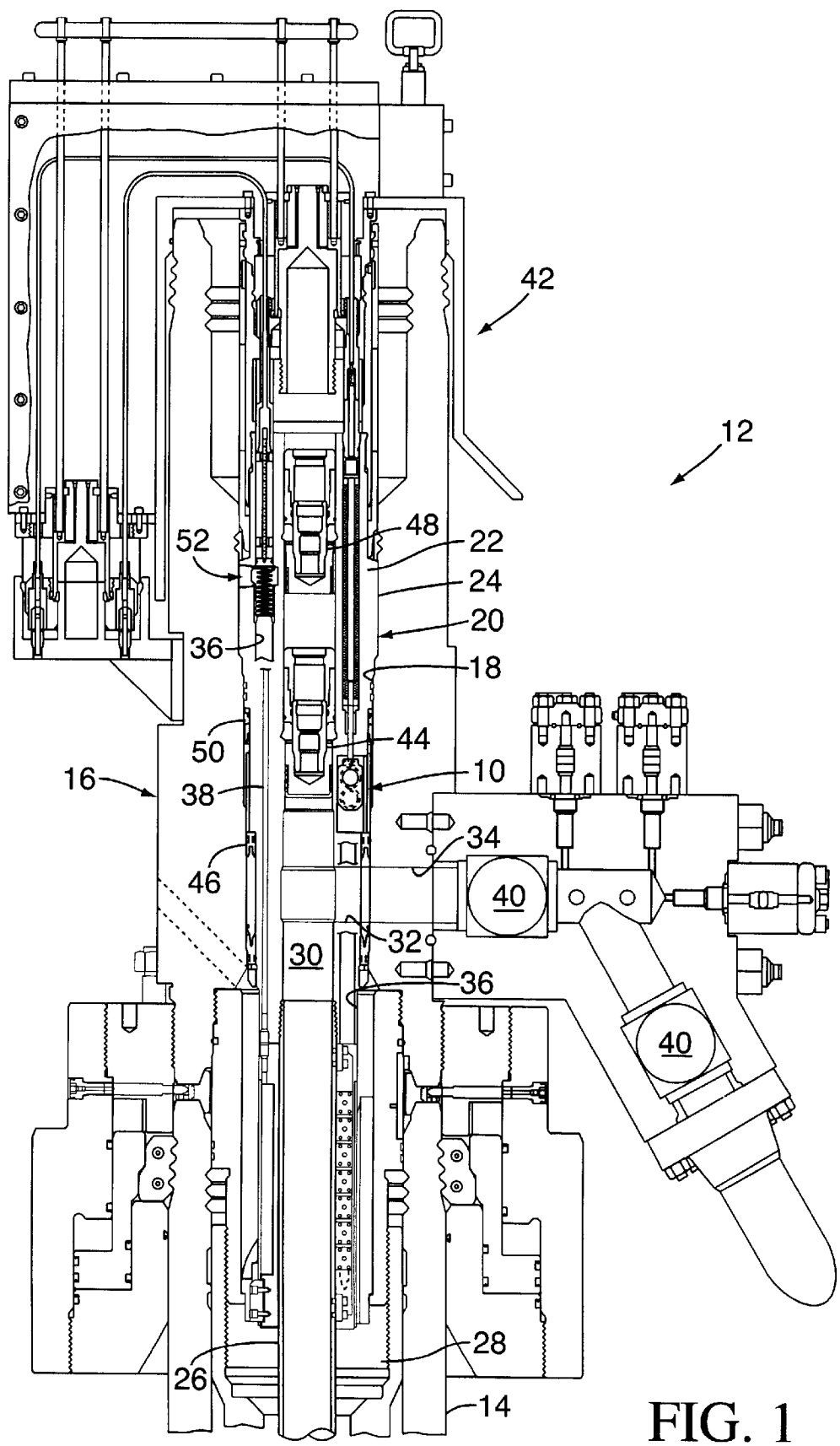
FIG. 1 is a longitudinal cross-sectional view of an exemplary flow completion system which comprises the gate valve of the present invention.

Referring to FIG. 1, a preferred embodiment of the gate valve 10 is shown installed in an exemplary flow completion system 12. As explained more fully in applicants' copending U.S. patent application Ser. No. 09/815,437, which is hereby incorporated herein by reference, the flow completion system 12 comprises a wellhead housing 14 which is installed near the top of a well bore (not shown), a tubing spool 16 which is connected over the wellhead housing 14 and which includes a central bore 18 that extends axially therethrough, and a tubing hanger 20 which is supported in the central bore 18 and which includes a generally annular body 22 having an outer, stepped cylindrical wall 24. The tubing hanger 20 supports at least one tubing string 26 which extends into the well bore and defines a tubing annulus 28 surrounding the tubing string. In addition, the tubing hanger 20 includes a concentric production bore 30 which communicates with the tubing string 26, a lateral production passageway 32 which extends between the production bore 30 and a production outlet 34 in the tubing spool 16, an annulus bore 36 which extends generally axially between the tubing annulus 28 and a portion of the central bore 18 located above the tubing hanger, and a number of service and control conduits 38 which extend generally axially through the tubing hanger. The flow completion system may also comprise one or more valves 40 for controlling flow through the production outlet 34, and a controls bridge 42 for connecting the annulus bore 36 and the service and control conduits 38 with corresponding external service and control lines (not shown).

In the flow completion system 12 depicted in FIG. 1, the tubing hanger 20 preferably also includes both of the industry required first and second barriers between the well bore and the environment, thus eliminating the need for a separate pressure sealing tree cap. The first barrier is provided by a first wireline crown plug 44 that is disposed in the production bore 30 above the production passageway 32, and a first annular, preferably metal seal 46 which is positioned between the tubing hanger 20 and the tubing spool 16 above the production passageway. Similarly, the second barrier is provided by a second wireline crown plug 48 that is mounted in the production bore 30 above the first crown plug 44, and a second annular, preferably metal seal 50 which is positioned between the tubing hanger 20 and the tubing spool 16 above the first seal 46. In accordance with the present invention, the tubing hanger 20 also includes the gate valve 10 and, in the embodiment of the invention depicted in FIG. 1, preferably also a second closure member 52, such as a sting open check valve, for controlling fluid flow through the annulus bore 36.

Referring to FIGS. 2–5, the gate valve 10 is unique in that substantially all of its operational components are housed entirely within the body 22 of the tubing hanger 20. In addition, the gate valve 10 is oriented generally axially within the tubing hanger 20 so as to occupy a minimum of the radial cross sectional area of the tubing hanger. In order to most readily accommodate this vertical orientation of the gate valve 10, the annulus bore 36 preferably includes a lateral branch which is connected to a longitudinal branch, and the gate valve is disposed across the lateral branch. For example, in the embodiment of the invention depicted in FIGS. 2–5, the annulus bore 36 is shown to comprise an upper branch 54 which extends generally axially through the body 22 to the top of the tubing hanger 20, a lower branch 56 which extends generally axially through the body to the bottom of the tubing hanger, and an intermediate branch 58 which extends generally laterally between the upper and lower branches. To facilitate the formation of the annulus bore 36, the intermediate branch 58 is ideally machined into the outer wall 24 and then sealed by a plug member 60 or any other suitable means.

In the embodiment of the invention depicted in FIGS. 2–5, the gate valve 10 is shown to comprise a generally rectangular gate cavity 62 which extends generally laterally through the outer wall 24 of the tubing hanger 20 and intersects the intermediate branch 58. In addition, an annular seat pocket 64 extending transversely into the body 22 is preferably formed at each intersection of the gate cavity 62 with the intermediate branch 58. The gate valve 10 also comprises two ring-shaped seats 66, each of which is positioned in a seat pocket 64, a gate 68 which is slidably disposed between the seats 66, and an actuating mechanism 70 which is positioned substantially in a service and control conduit 38 that extends generally axially over the gate cavity 62.

Figure 5:
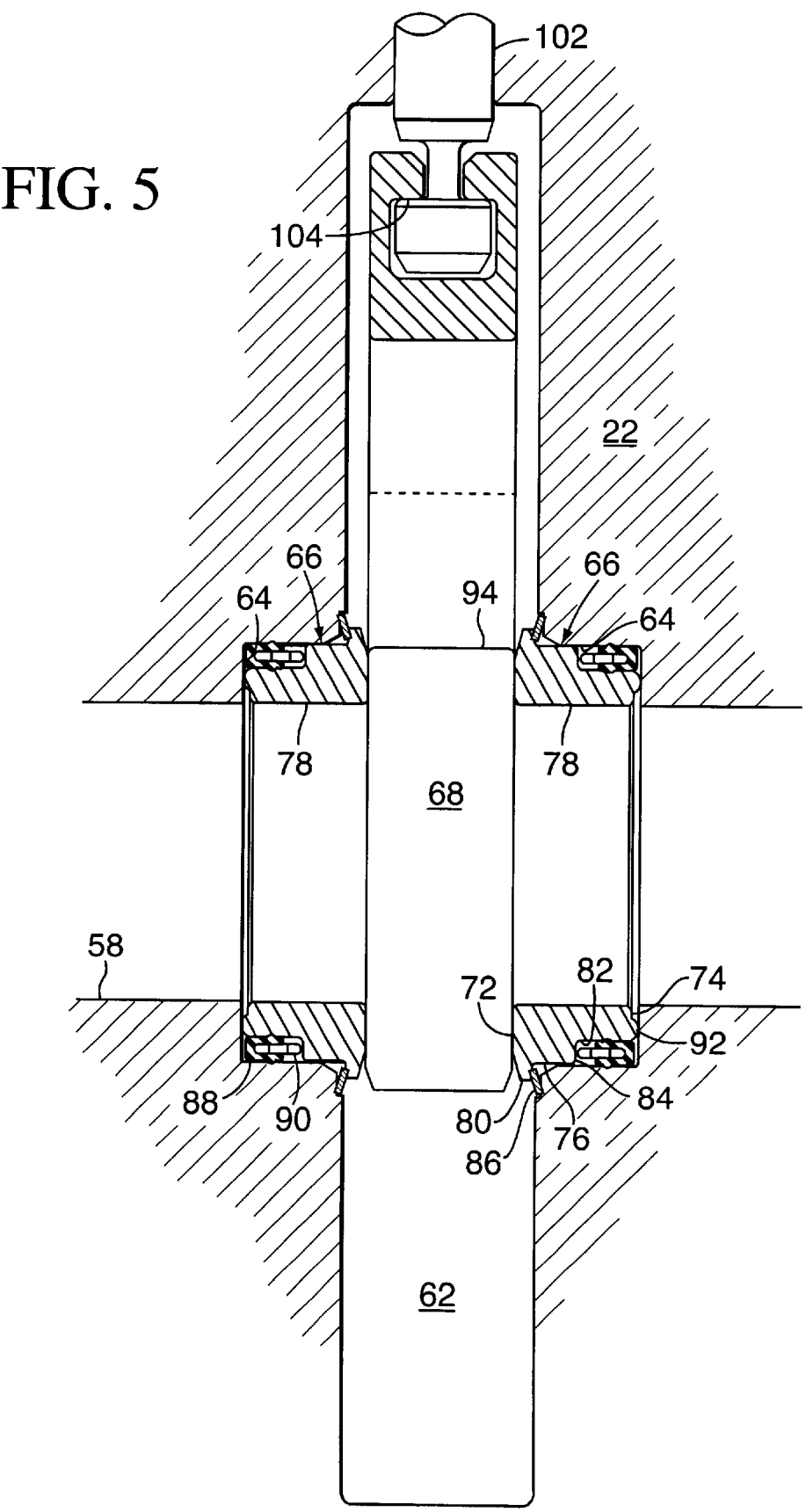
FIG. 5 is a longitudinal cross-sectional view of the gate and seat components of the gate valve of the present invention.

Referring specifically to FIG. 5, each seat 66 is preferably a floating seat which comprises a front face 72 that engages the gate 68, a rear face 74 opposite the front face, a generally cylindrical outer wall 76, and a coaxial through bore 78 that aligns with the intermediate branch 58. The outer wall 76 optimally comprises an enlarged diameter rim 80 adjacent the front face 72, a reduced diameter portion 82 adjacent the rear face 74, and a shoulder 84 located between the rim and the reduced diameter portion. In addition, a Belleville washer 86 or similar means is positioned between the rim 80 and the wall of the gate cavity 62 to urge the seat 66 against the gate 68, and an annular seal 88, such as a spring energized, pressure intensified straight bore-type seal, is disposed around the reduced diameter portion 82 to seal between the seat and the seat pocket 64. The seal 88 is preferably oriented so as to be enhanced by pressure in the gate cavity 62, and a spacer ring 90 having a plurality of radial holes extending therethrough may be placed between the seal and the shoulder 84 to maintain the seal properly positioned relative to the seat. Also, the rear face 74 is preferably rounded to form a circular sealing lip 92 to provide an additional seal, this one metallic, between the seat 66 and the seat pocket 64.

Figure 2:
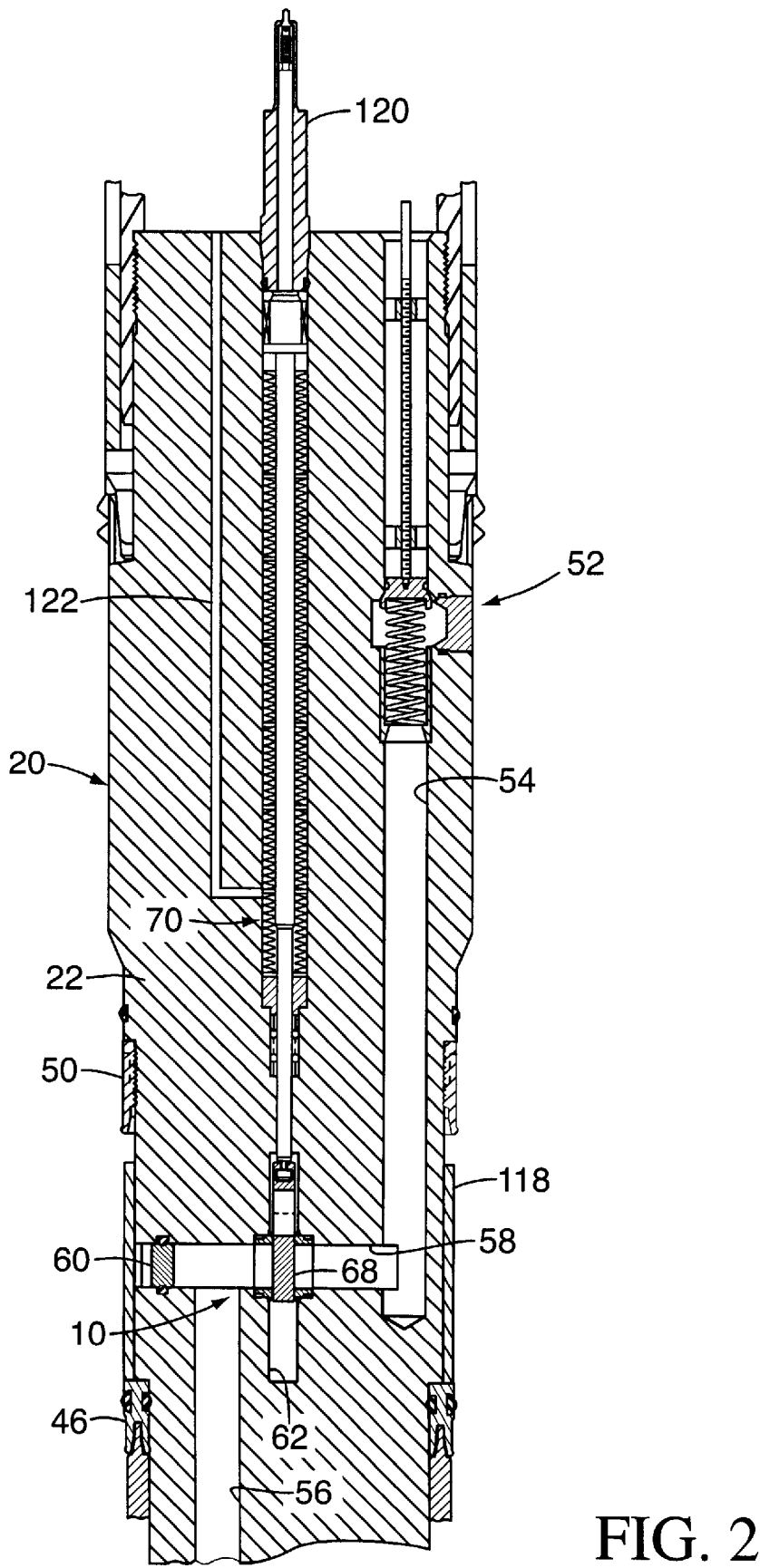
FIG. 2 is a longitudinal cross-sectional view of a portion of the tubing hanger component shown in FIG. 1 taken through the tubing hanger annulus bore and the gate valve.
Figure 3:
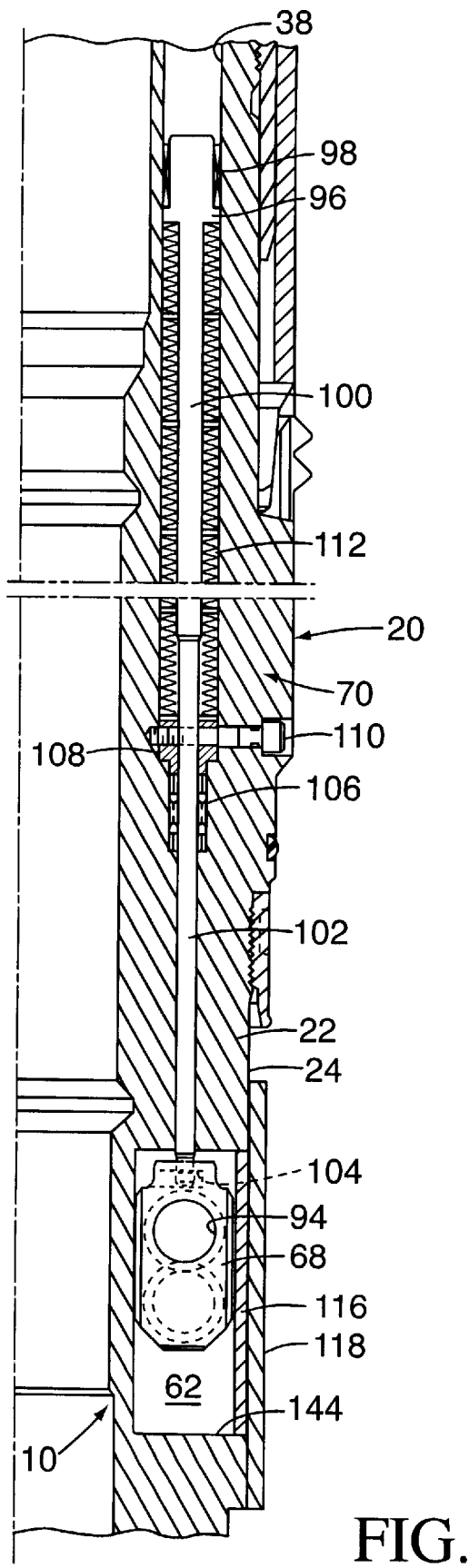
FIG. 3 is an enlarged longitudinal cross-sectional view of the gate valve shown in FIG. 2.
Figure 4:
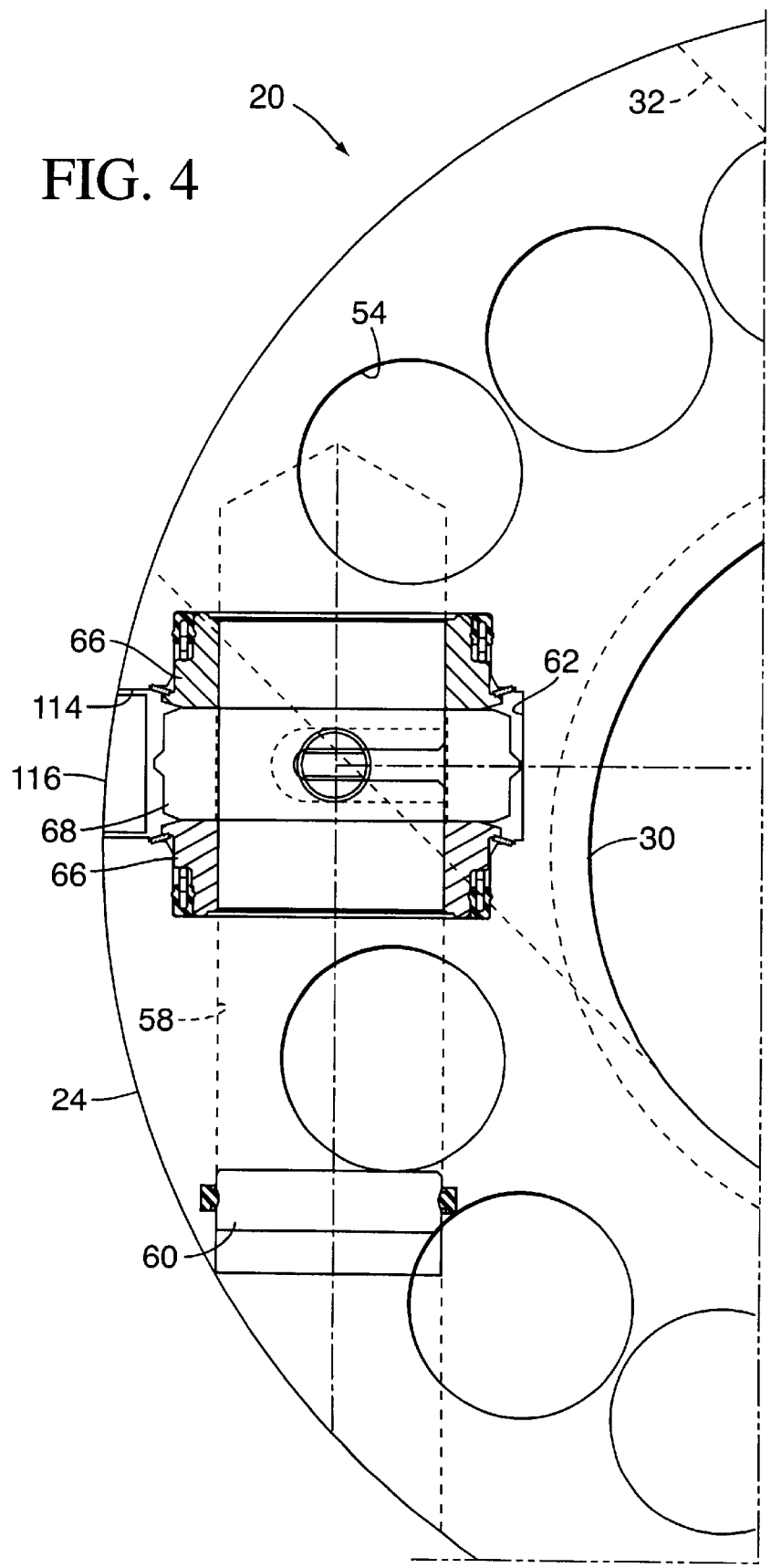
FIG. 4 is a radial cross-sectional view of a portion of the tubing hanger component and the gate valve shown in FIG. 1.

The actuating mechanism 70 functions to move the gate 68 between a valve open position, in which a transverse hole 94 in the gate is aligned with the intermediate branch 58, and a valve closed position, in which the hole 94 is offset from the intermediate branch (as shown in FIGS. 2 and 5). In a preferred embodiment of the invention, the actuating mechanism 70 comprises a piston head 96 which supports a piston seal 98 that engages the service and control conduit 38, an elongated piston rod 100 which is connected to the bottom of the piston head 96, and a valve stem 102 which is attached between the lower end of the piston rod 100 and the top of the gate 68, for example via a T-slot connection 104. Also, a suitable stem packing 106 is positioned between the valve stem 102 and the service and control conduit 38 to seal the gate cavity 62 from the portion of the service and control conduit located above the packing. The packing is ideally held in place by a gland nut 108 that is secured to the body 22 of the tubing hanger 20 by suitable means, such as a retainer screw 110. The actuating mechanism 70 preferably also includes a return biasing mechanism, which in the embodiment of the invention illustrated in FIGS. 2 and 3 comprises a mechanical biasing means 112, such as a stack of Belleville washers, that is operatively engaged between the piston head 96 and the gland nut 108.

In one embodiment of the present invention, the gate cavity 62 extends into the body 22 of the tubing hanger 20 between the first and second annular seals 46, 50 and consequently forms an opening 114 in the wall 24 that is positioned between the seals. The opening 114 is optimally closed by a simple cover plate 116 which is held in place by a cylindrical sleeve 118 that is telescopically received over the tubing hanger 20. The pressure within the gate cavity 62 is preferably contained by the first and second seals 46, 50 and the stem packing 106. Therefore, no need exists for a separate seal or seals between the cover plate 116 and the body 22 to contain the pressure within the gate cavity 62. However, the present invention contemplates that one or more such seals could be provided between the body 22 and either the cover plate 116 or the sleeve 118, to contain the pressure within the gate cavity 62, especially when the opening 114 is not located between the seals 46, 50. In addition, instead of the cover plate 116 being retained by the sleeve 118, the sleeve could be dispensed with and the cover plate simply bolted onto the body, in which event seals are preferably provided between the cover plate and the body 22 to retain the pressure within the gate cavity 62.

In the production mode of operation of the flow completion system 12, the gate valve 10 is normally in the closed position. When it is desired to open the annulus bore 36, a pressure sufficient to overcome the combined force of the mechanical biasing means 112 and the friction at the various interfaces of the gate valve 10 is introduced into the service and control conduit 38 above the piston head 96. This pressure will force the piston head 96 downward and thus move the gate 68 into the open position. In this position, fluid in the tubing annulus 28 is allowed to flow from the lower branch 56, through the intermediate branch 58 and into the upper branch 54, where it will encounter the second closure member 52, if present.

As shown in FIG. 2, a male coupling 120 of a conventional hydraulic coupler may be installed in the top of the service and control conduit 38 to facilitate connecting a source of high pressure hydraulic fluid to the service and control conduit. The male coupling 120 is engaged by a corresponding female coupling (not shown), which may be mounted, for example, in a tubing hanger running tool or the controls bridge 42 and which in turn is connected to the pressure source by a corresponding external service and control line. Alternatively, the top of the service and control conduit 38 may include a seal profile for a stab which is carried on the tubing hanger running tool or the controls bridge and which in turn is connected to the pressure source. The gate valve 10 may also comprises a compensation port 122 that extends through the body 22 of the tubing hanger 20 between the top of the tubing hanger and a portion of the service and control conduit 38 which is located below the piston head 96. While not shown in the drawings, a male coupling or stab seal profile may be provided at the top of the compensation port 122 to facilitate the connection of this port through the tubing hanger running tool or the controls bridge to a corresponding external service and control line.

When it is desired to close the gate valve 10, the pressure is removed from the service and control conduit 38, whereupon the force from the mechanical biasing means 112 combined with the pressure in the annulus bore 36 acting on the valve stem 102 will push the piston head 96 upward and move the gate 68 into the closed position. If the means supplying the pressure to the service and control conduit 38 should fail for any reason, the mechanical biasing means 112 will either retain the gate 68 in the closed position or move the gate from the open position to the closed position. Thus, in the preferred embodiment of the invention the gate valve 10 is a "fail closed" device.

In an alternative embodiment of the gate valve 10, the actuating mechanism 70 is a pressure balanced device. Thus, the return biasing mechanism would not require a mechanical biasing means 112. Instead, the compensation port 122 is connected to a source of high pressure hydraulic fluid. In order to return the gate valve 10 to the closed position, pressure is introduced into the compensation port 122 to force the piston head 96, and thus the gate 68, upward. In this embodiment, the gate valve 10 is a "fail as is" device.

Figure 6:
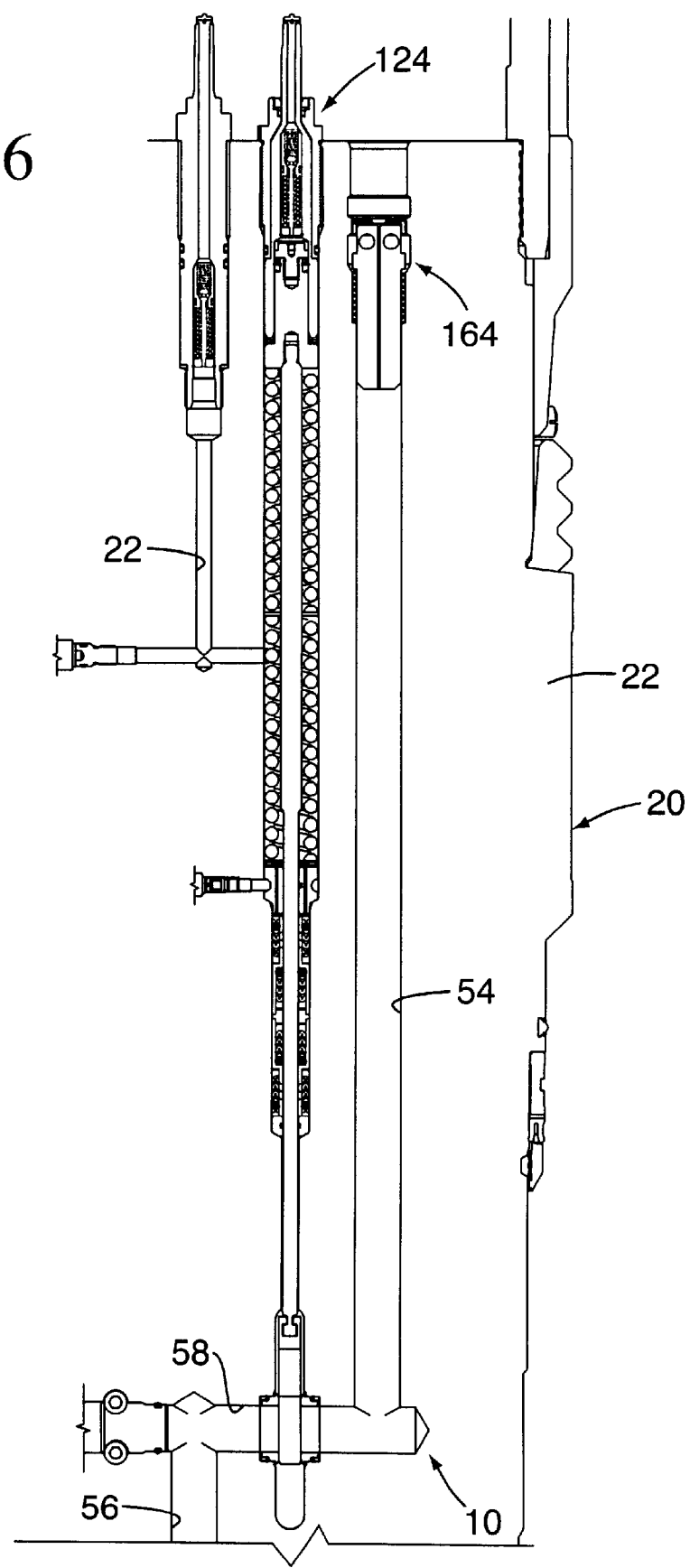
FIG. 6 is a longitudinal cross-sectional view of a portion of the tubing hanger component shown in FIG. 1 taken through the tubing hanger annulus bore and another embodiment of the gate valve of the present invention.

In accordance with another embodiment of the present invention, which is illustrated in FIG. 6, the actuating mechanism 70 may comprise a mechanical override feature to allow the gate valve to be actuated mechanically, for example in the event of a failure relating to the pressure source. This mechanical override feature is provided by a male override coupling 124 that is mounted in the top of the service and control conduit 38. During normal operation, the override coupling 124 conveys high pressure fluid to the service and control conduit 38 to hydraulically force the piston head 96 downward. However, in the event of a failure relating to the pressure source, an external actuator can push a portion of the override coupling 124 downward into engagement with the piston head 96 to mechanically force the piston head downward.

Referring to FIG. 7A, the override coupling 124, which is shown in its normal mode of operation, may be seen to comprise a coupling sleeve 126 which is movably retained within the service and control conduit 38 by a retainer sleeve 128. The coupling sleeve 126 comprises a stem 130 which includes an axial passage 132 and a number of radial ports 134 that connect the axial passage with the exterior of the stem, an upper receptacle 136 which is connected to the axial passage, and a lower receptacle 138 in which the piston head 96 is slidably received and against which the piston seal 98 is sealably engaged. The override coupling 124 also comprises a valve sleeve 140 which is slidably received in the upper receptacle 136 and is sealed therein by a ring seal 142, a keeper 144 which is secured in the upper receptacle below the valve sleeve, a valve pin 146 which is supported in the keeper and which extends longitudinally through a lower cavity 148 that is formed in the valve sleeve 140, and a return spring 150 which is positioned in the lower cavity between the keeper and the valve sleeve to urge the valve sleeve upwards against the top of the upper receptacle 136. The valve sleeve 140 also includes an upper cavity 152, an orifice 154 which extends between the upper cavity and the lower cavity 148, and an annular valve seat 156 that is formed between the upper cavity and the orifice. In addition, the upper cavity 152 houses a valve head 158 which is urged into sealing engagement with the valve seat 156 by a relief spring 160 that is supported in the upper cavity by a retainer ring 162.

In order to open the gate valve 10 during normal operation of the override coupling 124, a female coupling (not shown) is coupled to the stem 130 and pressurized hydraulic fluid is conveyed from the female coupling into the ports 134, through the axial passage 132 and into the upper cavity 152 of the valve sleeve 140. This pressure forces the valve sleeve 140 downward against the return spring 150, but the valve head 158 is prevented from moving downward by the valve pin 146. Instead, the valve head 158 separates from the valve seat 156 and allows the hydraulic fluid to flow through the orifice 154. The hydraulic fluid flows into the lower cavity 148, through an opening in the keeper 144 (not shown) and into the lower receptacle 138, where it will force the piston head 96 downward to open the valve.

In order to open the gate valve 10 in the manual override mode of operation of the override coupling 124, which is depicted in FIG. 7B, an device such as a stab plate attached to a tubing hanger running tool is pressed against the top of the stem 130 to push the coupling sleeve 126 downward. As a result, the bottom of the coupling sleeve 126 will contact the piston head 96 and force it downward, which will thereby open the gate valve.

Referring again to FIG. 7A, the override coupling 124 preferably includes a relief mechanism to prevent pressure from being trapped in the lower receptacle 138. Such trapped pressure could interfere with the return of the piston head 96 and thereby prevent the gate valve 10 from closing properly. In the absence of pressure in the upper cavity 152 of the valve sleeve 140, any pressure within the lower receptacle 138 will force the valve head 158 off the valve seat 156 and against the relief spring 160. The pressure will consequently be allowed to pass through the orifice 154 and exit the override coupling through the axial passage 132 and the radial ports 134.

Figure 8A:
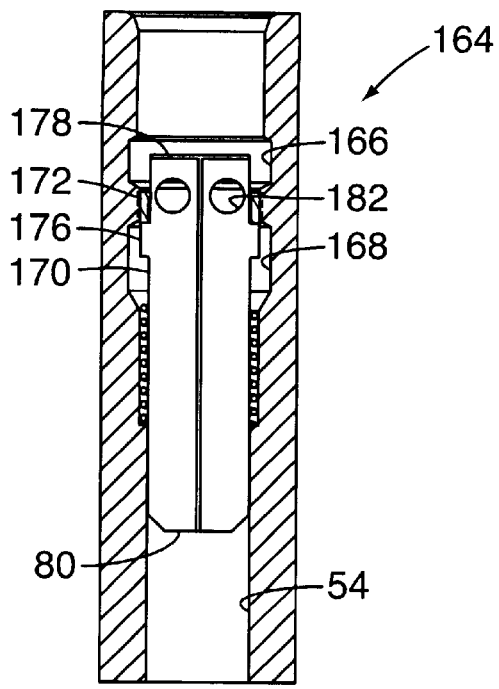
FIG. 8A is a longitudinal cross-sectional view of the annulus bore protector component depicted in FIG. 6 shown in its up position.

In the embodiment of the invention illustrated in FIG. 6, the flow completion system 12 may include a debris valve 164 in the upper branch 54 of the annulus bore 36 to prevent debris from collecting in the annulus bore. Referring to FIG. 8A, in order to accommodate the debris valve 164 the upper branch 54 ideally includes an upper expansion 166 and a lower expansion 168. Also, the debris valve 164 comprises a hollow cylindrical body 170 which is slidably received in the annulus bore, an annular collar 172 which is secured in the annulus bore between the upper and lower expansions, and a spring 174 which is operatively engaged between a shoulder in the annulus bore and a radial flange 176 extending from the body. In addition, the body 170 includes a closed top end 178, an open bottom end 180 and a number of lateral ports 182 which communicate with the interior of the body.

Figure 8B:
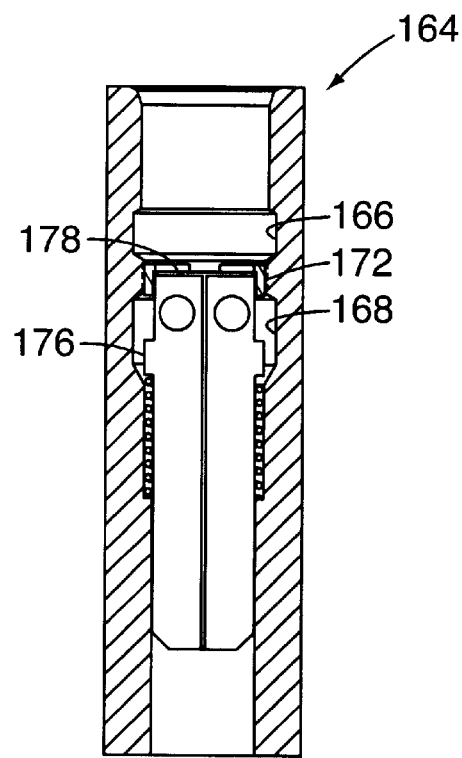
FIG. 8B is a longitudinal cross-sectional view of the annulus bore protector component depicted in FIG. 6 shown in its home position.
Figure 8C:
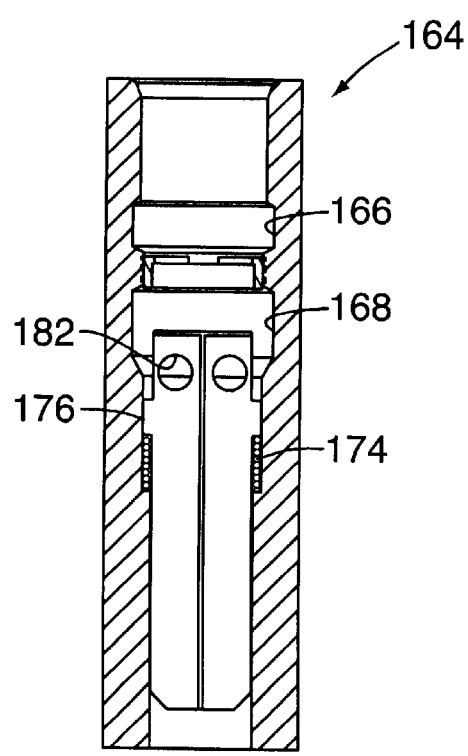
FIG. 8C is a longitudinal cross-sectional view of the annulus bore protector component depicted in FIG. 6 shown in its down position.

When the annulus bore 36 is closed, the spring 174 will urge the body 170 into the home position, in which the top end 178 is positioned within the collar 172 (FIG. 8B). In this position, debris is prevented from passing past the top end and into the annulus bore. If fluid is allowed to flow up through the annulus bore, the fluid will force the body 170 into the up position, in which the flange 176 is in contact with the collar 172 and the ports 182 are positioned at least partially in the upper expansion 166 (FIG. 8A). In this position, the fluid is allowed to flow up through the bottom end 180, out the ports 182, through the upper expansion 166 and up through the annulus bore. If fluid is forced down through the top of the annulus bore, the fluid will force the body 170 into the down position, in which the flange 176 is forced down against the spring and the ports 182 are positioned at least partially in the lower expansion (FIG. 8A). In this position, the fluid is allowed to flow past the lower expansion 168, in through the ports 182, out through the bottom end 180 and down through the annulus bore.

Figure 9:
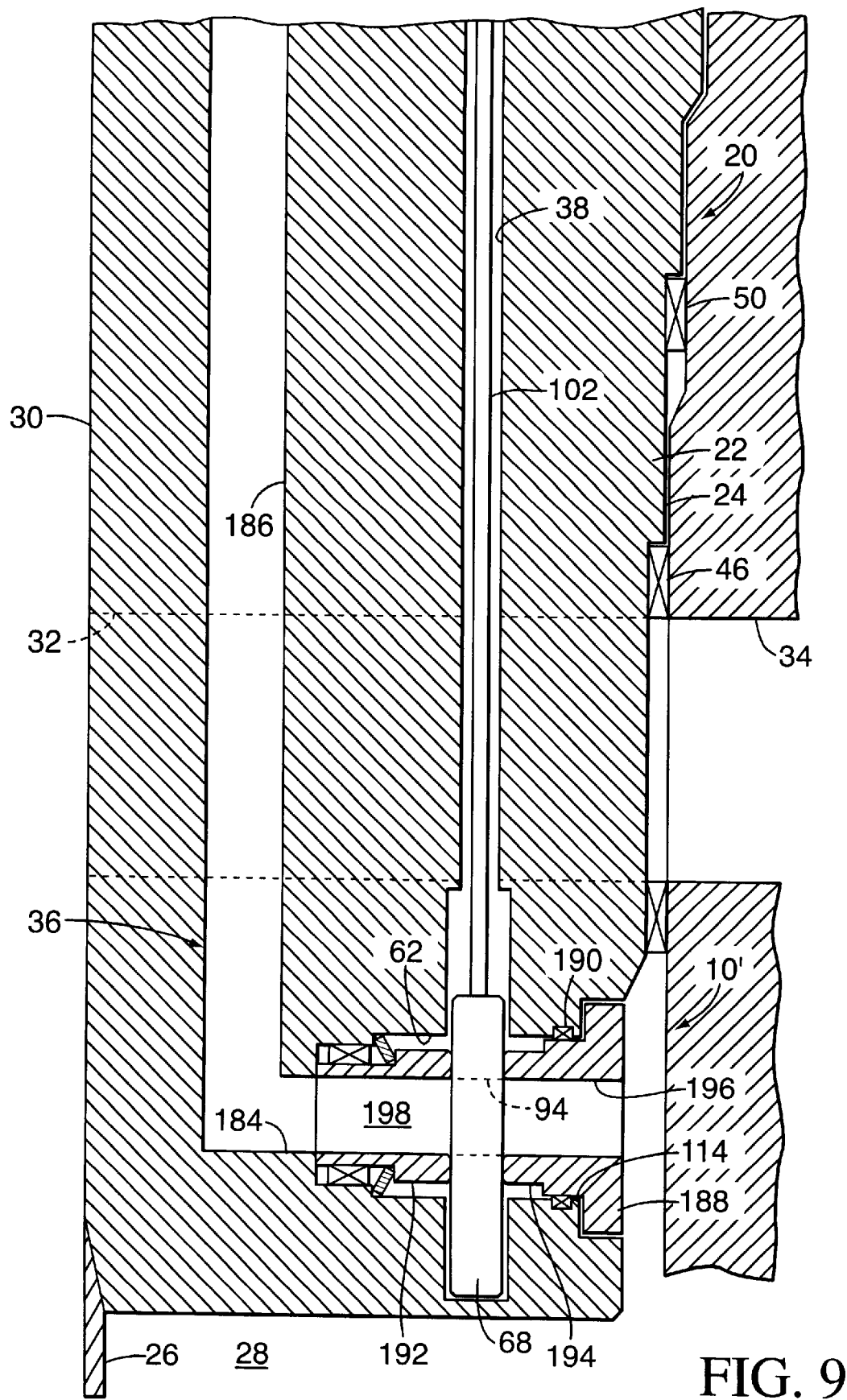
FIG. 9 is a partial longitudinal cross-sectional view of another embodiment of a gate valve assembly of the present invention.

Referring now to FIG. 9, another embodiment of a gate valve of the present invention, which is indicated generally at 10', is shown installed in an exemplary tubing hanger 20. In this embodiment the tubing hanger 20 is shown to comprise an annulus bore 36 having a first branch 184 which extends generally laterally through the tubing hanger from the tubing annulus 28, and a second branch 186 which extends from the first branch to the top of the tubing hanger. In addition, the gate valve 10' comprises a gate cavity 62 that extends laterally through the wall 24 of the tubing hanger generally coaxially with the first branch 184. The gate cavity 62 forms an opening 114 in the wall 24 which is preferably closed by a cover 188 that is ideally removably attached to the tubing hanger using any suitable means, such as bolts (not shown). In addition, the cover 188 is optimally sealed to the tubing hanger with at least one annular seal 190.

In the embodiment of the invention depicted in FIG. 9, the gate valve 10' is shown to comprise a gate 68 which is slidably disposed across the first branch 184 between a pair of seats 192, 194. The first seat 192 is similar to the seats 66 discussed above. The second seat 194 can be identical to the first seat 192 or, as shown in FIG. 9, it can comprise an annular body which is attached to or formed integrally with the cover 188. In either event, the cover 188 preferably includes a port 196 which aligns with the through bores in the seats 192, 194 to define a flow passage 198 through the gate valve 10' which extends between the tubing annulus 28 and the first branch 186.

The gate valve 10' further includes an actuating mechanism to move the gate 68 between a closed position, in which a lateral hole 94 in the gate is offset from the flow passage 198, to an open position, in which the hole 94 is aligned with the flow passage, as shown in FIG. 9. The actuating mechanism (not shown) is positioned in a service and control conduit 38 that is oriented generally vertically over the gate 68. In addition, the actuating mechanism, which can be similar to any of the actuating mechanisms discussed above, is connected to the gate 68 via a valve stem 102.

Although not illustrated in FIG. 9, it should be understood that other configurations of the gate valve are within the scope of the present invention. For example, the gate cavity 62 could extend longitudinally into the tubing hanger from the bottom thereof. Thus, the gate cavity would intersect the first branch 184 and provide a convenient means for installing the seats in the first branch. In this example, the cover which is used to close the opening that the gate cavity makes in the bottom of the tubing hanger would not include a port 196. Rather, the first branch 184 would communicate directly with the tubing annulus 28 through the wall 24 of the tubing hanger.

Also, although not depicted in the Figures, other configurations of the annulus bore 36 are considered to be within the scope of the present invention. For example, the first branch of the annulus bore could extend generally laterally through the tubing hanger and communicate with the portion of the central bore of the tubing spool that is located above the seals which are employed to seal the tubing hanger to the tubing spool. In this example, the second branch would extend generally longitudinally from the first bore down through the tubing hanger to the tubing annulus. In addition, the gate valve would preferably be installed in or near the top of the tubing hanger.

It should be appreciated that the gate valve of the present invention provides an effective and efficient means for controlling fluid flow through the annulus bore 36. The gate valve is recognized in the industry as being a robust and reliable closure member. Moreover, since the gate valve may be operated remotely, the time and expense associated with running and retrieving wireline plugs to control fluid flow through the annulus bore are eliminated. Furthermore, because the gate valve is oriented generally axially in the tubing hanger, it occupies a minimum radial cross-sectional area of the tubing hanger and therefore allows the tubing hanger to comprise a relatively large production bore and several service and control conduits.

It should be recognized that, while the present invention has been described in relation to the preferred embodiments thereof, those skilled in the art may develop a wide variation of structural and operational details without departing from the principles of the invention. For example, the various elements illustrated in the different embodiments may be combined in a manner not illustrated above. Therefore, the appended claims are to be construed to cover all equivalents falling within the true scope and spirit of the invention.

What is claimed is:

1. In combination with a component having an elongated body and a flow passage extending generally longitudinally through the body, the flow passage including a generally lateral first branch connected to a generally longitudinal second branch, a closure member comprising:
   a gate which is moveable generally longitudinally across the first branch between an open position in which a hole in the gate is aligned with the first branch and a closed position in which the hole is offset from the first branch;
   a conduit which extends through the body from the gate;
   actuating means positioned in the conduit for moving the gate from a first position to a second position; and
   returning means for moving the gate from the second position to the first position;
   wherein one of the first and second positions corresponds to the open position of the gate and the other position corresponds to the closed position of the gate;
   wherein the conduit extends generally longitudinally through the body such that the actuating means is generally aligned with the flow passage;
   wherein the actuating means comprises:
      a piston which is connected to the gate and which sealingly engages the conduit; and
      means for conveying hydraulic pressure to a first portion of the conduit which communicates with the piston; and
   wherein the conveying means comprises a fluid coupling member which is mounted in the conduit and which includes a flow port extending therethrough.

2. The closure member of claim 1, wherein the coupling member comprises:
   a coupling sleeve which is movable relative to the conduit; and
   means for retaining the coupling sleeve within the conduit;
   wherein the coupling sleeve is movable by an external force to engage the piston and thereby move the gate from the first position to the second position.

3. The closure member of claim 2, wherein at least a portion of the flow port extends through the coupling sleeve.

4. The closure member of claim 3, further comprising a valve positioned in the coupling sleeve for controlling the flow of hydraulic pressure through the flow port.

5. A closure member for use in a tubing hanger which is suspended in a tubing spool and which comprises an elongated body having an annulus bore that extends generally axially therethrough, the annulus bore comprising a generally lateral first branch connected to a generally axial second branch, the closure member comprising:
   a gate which is moveable generally axially across the first branch between an open position in which a hole in the gate is aligned with the first branch and a closed position in which the hole is offset from the first branch;
   a conduit which extends generally axially through the body from the gate;
   actuating means positioned in the conduit for moving the gate from a first position to a second position; and
   returning means for moving the gate from the second position to the first position;
   wherein one of the first and second positions corresponds to the open position of the gate and the other position corresponds to the closed position of the gate;
   wherein the actuating means comprises:
      a piston which is connected to the gate and which sealingly engages the conduit; and
      means for conveying hydraulic pressure to a first portion of the conduit which communicates with the piston; and
   wherein the conveying means comprises a fluid coupling member which is mounted in the conduit and which includes a flow port extending therethrough.

6. The closure member of claim 5, wherein the coupling member comprises:
   a coupling sleeve which is movable relative to the conduit; and
   means for retaining the coupling sleeve within the conduit;
   wherein the coupling sleeve is movable by an external force to engage the piston and thereby move the gate from the first position to the second position.

7. The closure member of claim 6, wherein at least a portion of the flow port extends through the coupling sleeve.

8. The closure member of claim 7, further comprising a valve positioned in the coupling sleeve for controlling the flow of hydraulic pressure through the flow port.

9. In combination with a flow completion system which comprises a component having an elongated body and a flow passage extending generally longitudinally through the body, the flow passage including a generally lateral first branch connected to a generally longitudinal second branch, a closure member comprising:

- a gate which is moveable generally longitudinally across the first branch between an open position in which a hole in the gate is aligned with the first branch and a closed position in which the hole is offset from the first branch;
- a conduit which extends through the body from the gate;
- actuating means positioned in the conduit for moving the gate from a first position to a second position; and
- returning means for moving the gate from the second position to the first position;
- wherein one of the first and second positions corresponds to the open position of the gate and the other position corresponds to the closed position of the gate;
- wherein the conduit extends generally longitudinally through the body such that the actuating means is generally aligned with the flow passage;
- wherein the actuating means comprises:
  - a piston which is connected to the gate and which sealingly engages the conduit; and
  - means for conveying hydraulic pressure to a first portion of the conduit which communicates with the piston; and
- wherein the conveying means comprises a fluid coupling member which is mounted in the conduit and which includes a flow port extending therethrough.

* * * * *